United States Patent [19]

Gehrt

[11] Patent Number: 4,686,401

[45] Date of Patent: Aug. 11, 1987

[54] SWITCH ASSEMBLY FOR ELECTRICAL MACHINERY

[75] Inventor: Louis M. Gehrt, Jefferson County, Mo.

[73] Assignee: Emerson Electric Co., St. Louis, Mo.

[21] Appl. No.: 820,228

[22] Filed: Jan. 21, 1986

[51] Int. Cl.⁴ .......................................... H01H 35/10
[52] U.S. Cl. ............................... 310/68 E; 200/80 R
[58] Field of Search .................. 200/80 R, 240-243, 200/246, 283, 247, 1 R, 5 R, 6 BB; 310/68 E; 318/793, 462, 325; 73/535, 538, 547

[56] References Cited

U.S. PATENT DOCUMENTS 3,433,908 3/1969 Cunningham ..................... 200/80 R
4,034,173 7/1977 Crow ................................. 200/80 R Primary Examiner—G. P. Tolin
Attorney, Agent, or Firm—Polster, Polster and Lucchesi

[57] ABSTRACT

A starting switch assembly integrally formed with a terminal connection board designed to selectively engage and disengage contacts for electrical machinery such as the windings for a dynamoelectric machine, the switch assembly including opposed contacts shaped and movable relative each other to provide rolling wipe-action contacting motion when actuated into contacting engagement to minimize contact wear, the contacts being yieldingly and resiliently maintained in selected engagement when so actuated to accommodate for machinery impact and vibration.

4 Claims, 9 Drawing Figures

SWITCH ASSEMBLY FOR ELECTRICAL MACHINERY

BACKGROUND OF THE INVENTION

This invention relates to switch assembly structure for electrical machinery and more particularly to an improved switch assembly structure which can be utilized in a number of types of electrical machinery such as in conjunction with conventional centrifugal actuators for dynamoelectric machines.

As is disclosed and described in U.S. Pat. No. 4,034,173, issued to William D. Crow et al on July 5, 1977, a number of dynamoelectric machines, for example capacitor start and split phase induction motors, utilize a first winding combination for the "starting" condition of motor operation, and a second winding combination for the "run" condition of motor operation. These motors include a stator assembly and a rotor assembly, the rotor assembly including a shaft and the stator assembly including a plurality of windings. The selective energization of the windings is used to generate suitable forces for rotating the rotor assembly in both "start" and "run" conditions. As is known in the art, a centrifugal actuator mounted on the shaft is utilized to move a switch arm of a switch assembly mounted on a terminal board between a first position and a second position to ultimately cause selective electrical energization of the winding combinations.

As has been stated in the above-noted Pat. No. 4,034,173, some of the desirable features of switch assemblies utilized in such environments are that they be low in overall construction, assembly and maintenance cost, have contact pressure independent of switch arm position, provide for lost motion adjustment, permit ready internal motor mounting as an integral part of terminal board structure, be straightforward and simple in construction and maintenance, and, at the same time, eliminate or at least reduce false engagement of the various connections. The modified switch assembly structure of the present invention not only effectively incorporates most of these aforediscussed desired features, but, in addition, provides a switch assembly arrangement which ensures positive contact engagement for selected switch arm movement increments and yet, at the same time, substantially minimizes contact wear and breakage to reduce expensive construction, maintenance and replacement costs. In addition, the arrangement of the present invention ensures positive electrical contact engagement and continued maintenance of such positive electrical engagement notwithstanding often experienced impact and vibrations of machinery with which switch assembly arrangements are associated.

Various other features of the present invention will become obvious to one skilled in the art upon reading the disclosure set forth herein.

SUMMARY OF THE INVENTION

More particularly, the present invention provides a switch assembly including a terminal board for connecting a power source to the switch assembly comprising: a first electrical contact means mounted to the board; a conductive means mounted to the board including a base portion and a flexible conductive member extending outwardly from the base portion in linear cantilevered fashion, the conductive member including a second electrical contact means positioned in spaced opposed relation to the first electrical contact means; a switch arm mounted for movement between at least a first position and a second position with respect to the terminal board to engage the cantilevered conductive member to urge the second contact means into contacting engagement with the first contact means; and means cooperative with the first and second contact means when they are urged into contact to provide yielding and resilient engagement therebetween to ensure positive electrical contact maintenance to accommodate for machinery impact and vibration. In addition, the present invention provides a novel opposed contact means shaped and movably engageable relative to each other to provide a roll wipe-action contact to maintain electrical contact even under adverse environmental conditions and to minimize contact wear. Further, the present invention provides a switch arm construction which engages the conductive member that includes the contact means at a linearly offset location in a manner to provide positive contact engagement notwithstanding conventional variation in switch arm position, further permitting lost motion action and enhancing the above-mentioned wear efficient, roll wipe action.

It is to be understood that various changes can be made by one skilled in the art in the shape, construction and operation of the several parts of the structure disclosed herein without departing from the scope or spirit of the present invention.

BRIEF DESCRIPTION OF THE DRAWINGS

Referring to the drawings which disclose one advantageous embodiment of the present invention.

DESCRIPTION OF THE PREFERRED EMBODIMENT

Figure 1:
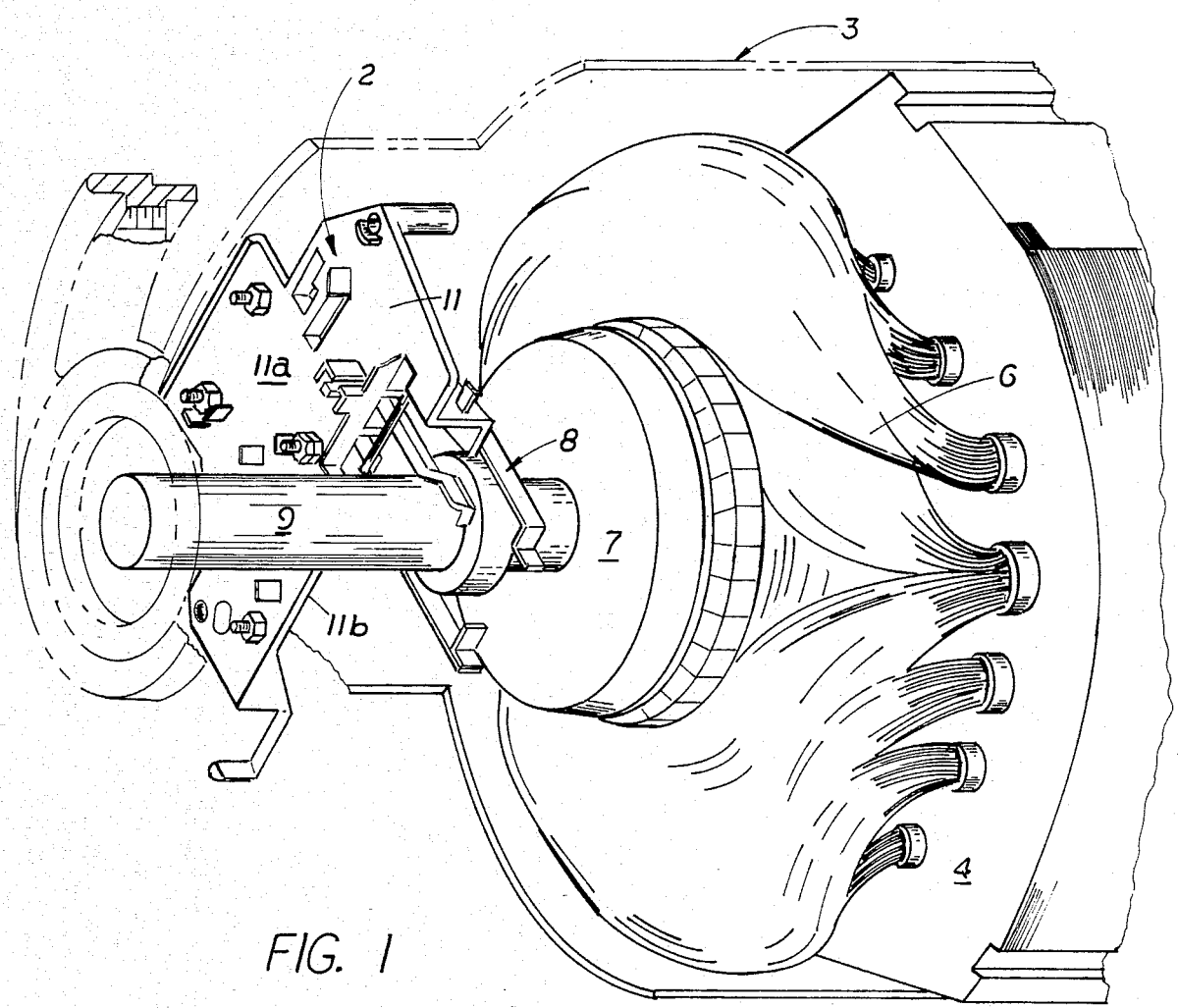
FIG. 1 is an exploded view in perspective, partly broken away, illustrating the inventive switch assembly positioned in a conventional dynamoelectric machine in a manner similar to the switch assembly of above-mentioned U.S. Pat. No. 4,034,173.
Figure 2:
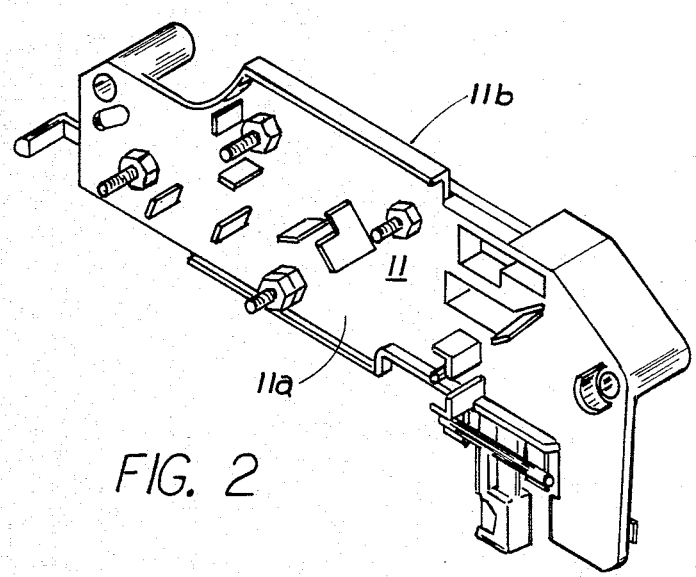
FIG. 2 is an enlarged view in perspective of a terminal board utilized in conjunction with the inventive switch assembly.
Figure 4:
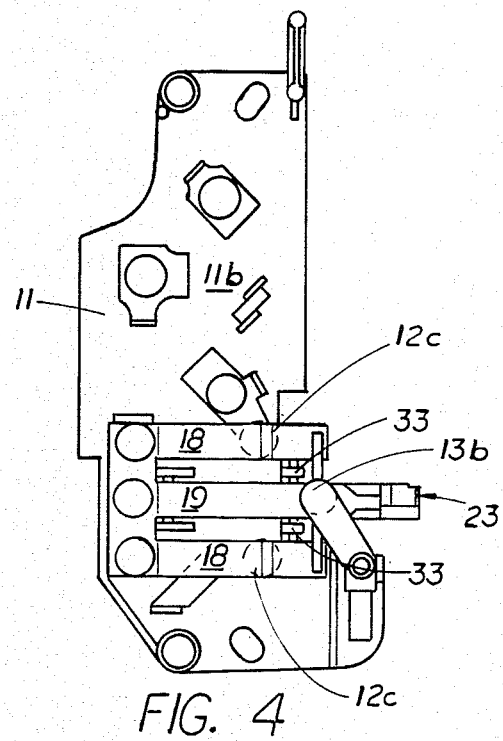
FIG. 4 is a plan view of the other side or face of the terminal board and switch assembly of FIGS. 2 and 3, the assembly as shown in FIG. 3 having been reversed to show such other side or face.
Figure 5:
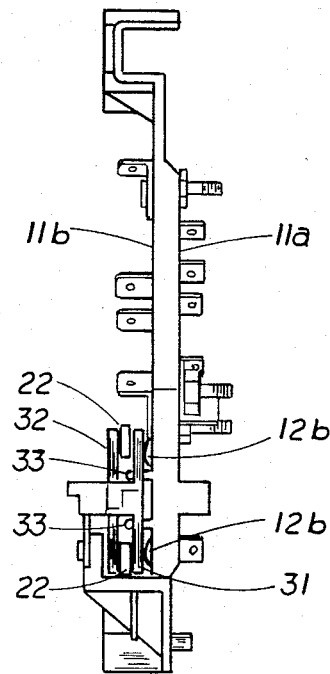
FIG. 5 is an end or edge view of the terminal board and switch assemby of FIGS. 2-4, looking from left to right on FIG. 4.
Figure 3:
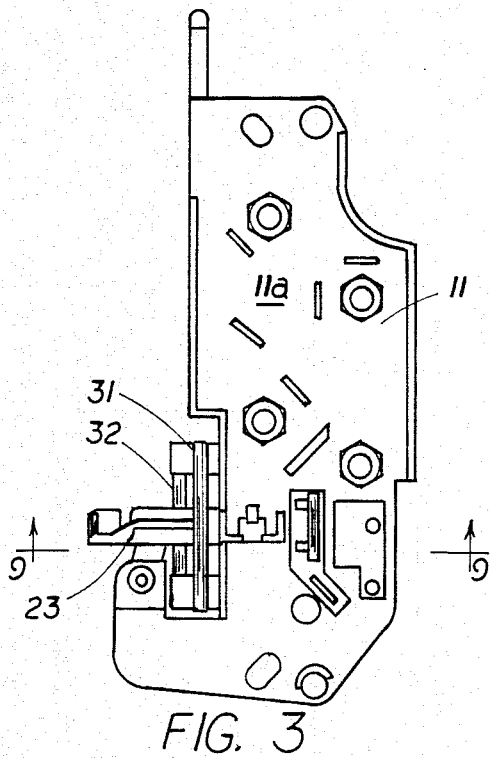
FIG. 3 is a plan view of one side or face of the terminal board and switch assembly shown in FIG. 2, looking downwardly from left to right, with the switch assembly showing in the upper portion of this Figure.

Referring to FIG. 1 of the drawings, the inventive switch assembly broadly indicated by reference numeral 2 is shown in its application with an electric motor broadly indicated by reference numeral 3. Motor 3 includes a stator assembly having a plurality of windings 6, the selective energization of which are utilized to generate force for rotating the rotor assembly 7. A centrifugal actuator 8 is mounted to shaft 9 of rotor assembly 7, the centrifugal actuator including a part movable relative shaft 9 to engage with the switch arm - hereinafter described - of switch assembly 2.

More specific details of the aforedescribed dynamoelectric machine are set forth in aforementioned U.S. Pat. No. 4,034,173 and are therefore, for purposes of brevity, not described in detail herein, the disclosure of U.S. Pat. No. 4,034,173, as it relates to particulars of construction of a dynamoelectric motor and the circuitry for the windings, other than the switch assembly, being incorporated herein by reference.

Referring to FIGS. 2-5 and 9 of the present drawings, a terminal board 11 is disclosed as including a first side or face 11a and an opposite second side or face 11b. As known in the art, the terminal board 11 is so sized and adapted to be mounted within the chamber of motor 3, details of such mounting not being described herein.

The electrical circuitry including the quick connect terminals on face or side 11a of terminal board 11 passing through terminal board 11 to connect with the electrical contacts on face or side 11b of terminal board 11 are also not described in detail herein since this circuitry is substantially like that described in detail in aforementioned U.S. Pat. No. 4,034,173, and, as above indicated, is incorporated by reference herein for purposes of brevity. For the purpose of description of the present invention herein, it is sufficient to note that the pair of electrical contacts 12b mounted on side 11b of terminal board 11 (FIGS. 5 and 9) can be electrically connected to one set of windings ("start") for the stator and the contact 13b (FIGS. 4 and 9) can be electrically connected to another set of windings ("run") in a manner similar to the electrical connections described in U.S. Pat. No. 4,034,173. These above-described pair of electrical contacts 12b mounted to the terminal board side 11b and the third electrical contact 13b, which, as in U.S. Pat. No 4,034,173, is so mounted on terminal board side 11b as to be spacially displaced from contacts 12b and removed from side or face 11b of terminal board 11, comprise part of switch assembly 2 of the present invention.

Figure 9:
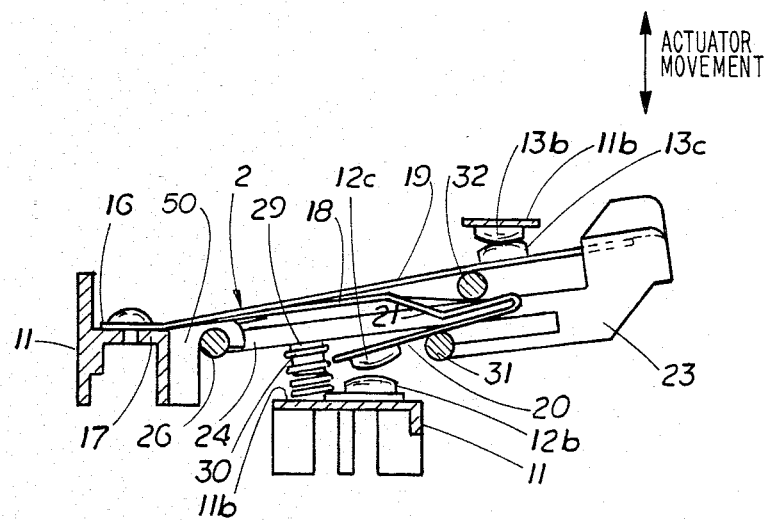
FIG. 9 is an enlarged cross-sectional view of a portion of the switch arm and conductive element assembly of the structure of FIGS. 2-8, taken in a plane through line 9—9 of FIG. 3 and rotated 180°.
Figure 8:
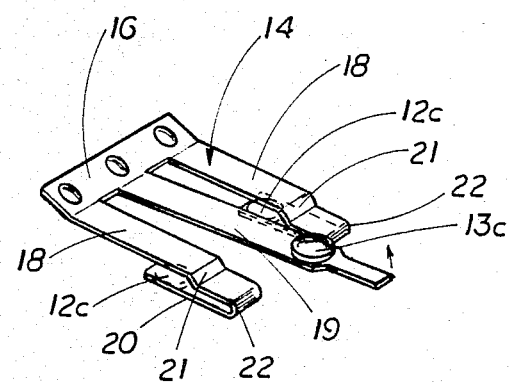
FIG. 8 is an isometric view of the conductive element of FIGS. 2-5, looking from the same side as the plan view of FIG. 4.

As can be seen more clearly in tne present drawing, FIGS. 8 and 9, switch assembly 2 includes a conductive element 14, the base 16 of which is mounted to a raised shoulder or support 17 integral with terminal board 11 (FIG. 9) and electrically connected into the circuit in a manner hereinbefore described in U.S. Pat. No. 4,034,173. Conductive element 14, as disclosed, includes three spaced, parallel, flexible linear conductive members extending outwardly in cantilevered fashion from base 16, designated as outer linear conductive members 18 and intermediate conductive member 19. These cantilevered linearly extending conductive members 18 and 19 are bent at the base 16 a sufficient amount so that the free ends of outer pair 18 of such members extend in laterally spaced relation from the free end of intermediate member 19. A further laterally offset bend 21 is provided in each outer member 18 intermediate its extremities and, as can be seen in FIGS. 8 and 9, each outer member 18 is further bent at 22 in U-shaped fashion at its free end approximately 180° upon itself to include end portion 20 parallel to and spaced from the body of member 18. As will be noted, the turned-in bent free end portion 20 of each outer member 18 includes on the outer face thereof an electrical contact 12c positioned to engage with one of the pair of contacts 12b on terminal side 11b of terminal board 11. The free end extremity of intermediate conductive member 19, which is not bent (but which could include a U-bend and in-turned end portion if desired) carries a contact 13c which engages with spacially displaced contact 13b extending integrally from side 11b of terminal board 11. It is to be noted that the several bends at the base, intermediate and at the extremities of the conductive members are so dimensioned that there is a small gap between contacts 12c and 12b and contact 13c and 13b before they are respectively urged into engagement to accomplish the desired lost motion action previously described in U.S. Pat. No. 4,034,173, the space between the body and end portions 20 of members 18 further facilitating such lost motion.

Figure 7:
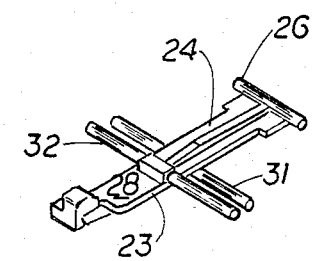
FIG. 7 is an isometric view of the switch arm of FIG. 6, looking from the other side or face thereof.
Figure 6:
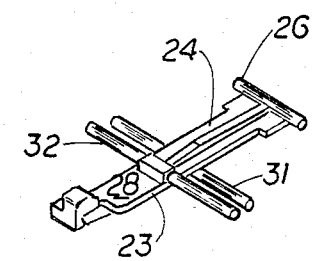
FIG. 6 is a plan view of only the switch arm of FIGS. 2-5, lookng from the same side or face as the plan view of FIG. 3.

In accordance with the present invention, the U-shaped bend at 22 with the spaced body 18 and end portion 20 serves to provide yielding and resilient engagement between contacts 12b and contacts 12c to ensure positive electrical contact maintenance to accommodate for machinery impact and vibration. To actuate movement in conductive members 18, switch arm 23, shown in FIGS. 6, 7 and 9, is provided. Arm 23 includes a body portion 24 terminated at one extremity by the short cross bar 26 to provide a T-shape. The extremities of the cross bar 26 are pivotally mounted in hooks 50, only one of which is shown in FIG. 9 for drawing simplicity, integral with terminal board 11 and extending from side 11b thereof to allow pivotal movement of the arm 23 about the axis of cross bar 26 toward and away from terminal board side 11b. Body 24 of switch arm 23, which is ribbed for strength, has a first side 27 and an opposite side 28. Side 27 which faces terminal board side 11b is provided with a projection 29 to receive and seat one end of coil spring 30, the coil spring serving to pivotally urge switch arm 23 away from side or face 11b of terminal board 11 so that contacts 12c on conductive members 18 can be urged from electrical engagement with contacts 12b on terminal board 11. To actuate conductive members 18 for contacting electrical engagement and disengagement, body 24 of switch arm 23 is further provided with spacially disposed, offset cross bars 31 and 32. Cross bar 31 is fastened to and extends crosswise to side 27 of body 24 and cross bar 32 is fastened to and extends crosswise to side 28 of body 24. These spacially disposed, offset crossbars engage along opposite sides of the spaced body portions and the bent free end portions 20 of cantilevered linear extending conductive members 18 to limit movement of the bent free end portions therebetween.

It is to be noted that spaced offset cross bars 31, 32 engage the parallel body and free end portions 20 of the flexible conductive members 18 at a location linearly offset from and beyond the opposed electrical contacts 12b, 12c and that these opposed electrical contacts 12b and 12c on the terminal side 11b and free end portions of conductive members 18, respectively, have opposed mirror-image curvilinear convex surfaces. Accordingly, when contacts 12b, 12c are brought into contacting engagement by switch arm 23 and spaced offset crossbars 31, 32 and any further pivotal pressure is applied to conductive members 18 through switch arm 23 to provide overtravel, the yielding and resilient engaging contact surfaces 12c mounted on the bent free end portions 20 of conductive members 18 tend to pivot about surfaces 12b to provide a rolling wipe-action contacting motion relative the engaging contacts 12b, 12c which minimize contact wear and ensures a clean area for electrical contact. In fact, it has been determined that the life expectancy of the inventive switch assembly structure when compared with previously known switch assembly structures has increased from a previously normal life expectancy figure of 500,000 cycles to as much as a minimum of almost 3,000,000 cycles and even as much as nearly 4,000,000 cycles. Or, in other words, the inventive structure abovedescribed has resulted in an increase in life cycle expectancy of six to eight times over the life cycle expectancy of previously known switch assembly structures.

It is to be noted that the electrical contact 13c on conductive member 19 and opposed contact 13b —which contacts 13b and 13c are brought into contacting electrical engagement when contacts 12b and 12c are disengaged through movement of switch arm 23—also can be provided with opposed contacting surfaces of electrical contacts 12b, 12c and that the body of linear extending conductive member 19 can also include a free end bent portion like free end bent portions 20 of conductive members 18. It further is to be noted that movement of switch arm 23 away from side 11b is limited by spaced, "L" hooks 33 which are integral with and project normally outward from terminal side 11b of terminal board 11 to engage the extending extremities of cross bar 31 and stop the pivotal movement of switch arm 23 as it is urged away from side 11b of terminal board 11 by coil spring 30.

Operation of the electrical circuitry connected to switch assembly 2 is similar to operation of the electrical circuitry in the above-noted U.S. Pat. No. 4,034,173. In the "start" position of electric motor 3, the centrifugal actuator abuts switch arm 23 forcing contacts 12b, 12c into engagement while contacts 13b, 13c are disconnected. Through connecting electrical circuitry (details of which are described in U.S. Pat. No. 4,034,173), rotor assembly 7 starts to rotate and as it increases speed, the centrifugal actuator 8 is caused to move to disengage from switch arm 23. Resilient coil spring 30 urges switch arm 23 away from terminal side 11b of terminal board 11 and contacts 12b, 12c disengage, movement of switch arm 23 being stopped by engagement of cross bar 31 with "L" hooks 33, the contacts 12b, 12c being disengaged and spaced from each other. Movement of the switch arm 23 is sufficient to enable contacts 13b, 13c to engage thereby transferring electrical power from contacts 12b, 12c to contacts 13b, 13c placing the windings of stator assembly 4 into a motor "run" position from a motor "start" position.

In accordance with the present invention, during the course of operation and as aforenoted, contacts 12b and 12c when held in engagement by switch arm 23 against the action of biasing spring 30 are yieldingly and resiliently held there by the spring action of the bent free end portion 20 of conductive members 18 to ensure electrical contact maintenance accommodating normal machinery impact or vibration. At the same time, any further pressure on these contacts provides a rolling wipe-action due to the cantilever surfaces of the contacts and the removed location at which such pressure would be applied through the cross bars 31, 32 relative the location of contact engagement.

It is to be understood that the present invention is not limited to two position switch assemblies for dynamoelectric machines but can be employed in other switch assemblies, single or multiple position, utilized in other types of electrical machinery. Further various changes can be made in the structural embodiment disclosed by one skilled in the art without departing from the spirit of the present invention. For example, it would be possible to utilize a leaf spring arrangement instead of the coil spring 30 described in conjunction with switch arm 23 and it even would be possible to utilize modified male-female knife type switch contacts in place of the curvilinear convex surfaced contacts described hereinabove.

Having thus described the invention, what is claimed and desired to be secured by Letters Patent is:

1. In an electric motor having a stator assembly and a rotor assembly, said rotor assembly including a shaft, said stator assembly including a plurality of windings, the selective energization of said windings being utilized to generate a force for rotating said rotor assembly, and a centrifugal actuator mounted to said shaft, the improvement which comprises a terminal board for electrically interconnecting said windings to a source of power, said terminal board having a switch assembly attached to it, said switch assembly adapted to interconnect respective ones of said windings to a source of power, said switch assembly including a first pair of electrical contacts mounted to said terminal board; a third electrical contact spacially displaced from said first pair of electrical contacts and mounted to said board; a conductive means mounted to said board including a base portion and at least three spaced, flexible linear conductive members extending outwardly from said base portion, each linear conductive member including an electrical contact positioned in opposed relation to an electrical contact on said board, with two of said linear conductive members being bent to bias said electrical contacts thereon toward said first pair of electrical contacts on said board and the third conductive member being oppositely bent to bias the electrical contact thereon toward said spacially displaced third electrical contact on said board; a switch arm mounted for movement between at least a first position and second position relative said terminal board in response to said centrifugal actuator to provide selective energization of said windings, and switch arm engaging said linear conductive members to urge those electrical contacts thereon and opposed to said first pair of electrical contacts on said board into engagement while releasing said electrical contact opposed to said spacially displaced third electrical contact on said board when moved in one direction and vice versa when moved in a second direction; and means cooperative with at least certain of said opposed electrical contacts when urged into contact to provide yielding and resilient engagement therebetween to ensure electrical contact maintenance in the event of machinery impact and vibration, said last metnioned means including said conductive members, at least two of said conductive members having a reverse bend such that such members have overlapping portions.

2. The switch assembly of claim 1, the reverse bend of said switch arm of said opposed electrical contacts being so shaped so that said opposed electrical contacts are movable relative each other to provide a rolling wipe-action contacting motion relative each other when actuated into contacting engagement with each other to minimize contact wear.

3. The switch assembly of claim 1, at least said first pair of electrical contacts on said terminal board and said opposed electrical contacts on said conductive members including opposed mirror-image curvilinear convex surfaces with the free end portions of said cantilevered conductive members on which said opposed electrical contacts are included extending beyond said contacts thereon, each of said free ends being bent upon itself in spaced substantially parallel relation to the cantilever member to provide yielding and resilient contact engagement between opposed contacts mounted thereon when said switch arm is moved, said switch arm having spacially disposed, offset cross-bars engaging along opposite sides of said bent free-end portions and the body portions of said flexible conductive members at a location linearly offset from said contact means, said engaging means further serving to limit movement of said bent free-end extremities, a coil biasing spring mounted between said terminal board and said switch arm to bias said switch arm away from said terminal board to urge the electrical contact on said third linear conductive member into engagement with said spacially displaced third electrical contact on said board, and hook members integral with and extending normal from said terminal board to engage one of said cross-bars of said switch arm to limit said biasing spring action.

4. In an electric motor having a stator assembly and a rotor assembly and a terminal board for electrically connecting the motor to a source of power, said terminal board having a switch assembly attached to it, said switch assembly adapted to interconnect said motor to a source of power and a centrifugal actuator for operating said switch, the improvement which comprises a conductive means mounted to said board including a base portion having at least three spaced flexible linear conductive members extending outwardly from said base portion, at least two of said electrically conductive members including an integral U-shaped reverse bend formed therein such that each of said two conductive members has overlapping portions, said portions providing yielding and resilient engagement of the switch contacts, and electric contacts mounted to said at least two conductive members on said reverse bends thereof.

* * * * *